(12) United States Patent
Jones

(10) Patent No.: US 8,380,783 B1
(45) Date of Patent: Feb. 19, 2013

(54) METHOD AND APPARATUS FOR PROCESSING WEB CALLS IN A WEB CALL CENTER

(75) Inventor: Bryce A. Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 288 days.

(21) Appl. No.: 09/477,991

(22) Filed: Jan. 5, 2000

(51) Int. Cl.
*G06F 15/16* (2006.01)

(52) U.S. Cl. ......... 709/203; 370/352; 370/386; 370/449

(58) Field of Classification Search ............... 709/203, 709/217, 218, 219, 226, 227, 231, 206, 204; 379/265.09, 265.01, 265.02; 370/270, 352, 370/386

See application file for complete search history.

(56) References Cited

U.S. PATENT DOCUMENTS

| | | | |
|---|---|---|---|
| 5,206,903 A | 4/1993 | Kohler et al. | |
| 5,592,541 A | 1/1997 | Fleischer, III et al. | |
| 5,675,635 A | 10/1997 | Vos et al. | |
| 5,828,740 A | 10/1998 | Khuc et al. | |
| 5,958,014 A * | 9/1999 | Cave | 709/229 |
| 6,233,565 B1 * | 5/2001 | Lewis et al. | 705/35 |
| 6,493,447 B1 * | 12/2002 | Goss et al. | 379/265.09 |
| 6,496,931 B1 * | 12/2002 | Rajchel et al. | 713/168 |
| 6,687,241 B1 * | 2/2004 | Goss | 370/352 |
| 6,744,761 B1 * | 6/2004 | Neumann et al. | 370/389 |
| 6,826,194 B1 * | 11/2004 | Vered et al. | 370/449 |
| 6,836,476 B1 * | 12/2004 | Dunn et al. | 370/352 |
| 7,536,002 B1 * | 5/2009 | Ma et al. | 379/266.02 |
| 2001/0038624 A1 * | 11/2001 | Greenberg et al. | 370/352 |
| 2001/0044822 A1 * | 11/2001 | Nishio | |
| 2002/0021693 A1 * | 2/2002 | Bruno et al. | 370/386 |

OTHER PUBLICATIONS

Lara et al., Web Server Content Replication, Feb. 27, 2003, Patent Application Publication, US 2003/0041494 A1.*
U.S. Appl. No. 08/800,819, filed Feb. 14, 1997.
U.S. Appl. No. 09/063,902, filed Apr. 21, 1998.
U.S. Appl. No. 09/093,011, filed Jun. 5, 1998.
U.S. Appl. No. 09/112,566, filed Jul. 9, 1998.
U.S. Appl. No. 09/324,277, filed Jun. 2, 1999.
U.S. Appl. No. 09/301,381, filed Apr. 27, 1999.
U.S. Appl. No. 09/300,688, filed Apr. 27, 1999.
U.S. Appl. No. 09/300,032, filed Apr. 27, 1999.
U.S. Appl. No. 09/299,391, filed Apr. 27, 1999.

* cited by examiner

*Primary Examiner* — Barbara Burgess

(57) ABSTRACT

A web call server provides call processing for web calls. The call processing for web calls comprises routing, queuing, and/or provision of web service applications. For routing, the web call server receives a call request message. In response to receiving the call request message, the web call server identifies a web call center resource. The web call server then generates and transmits a routing instruction to route the web call to the web call center resource. For queuing, the web call server receives a call request message for a web call. The web call server then determines whether any web call center resource is available to handle the web call in response to receiving the call request message. The web call server then transfers a web call indicator to a web call queue in response to the determination that all web call center resources are unavailable. For web service applications, the web call server receives a call request message for the web call. The web call server then identifies the web service application for the web call. After identifying the web service application, the web call server generates and transmits an instruction to provide the web service application to the web call.

20 Claims, 4 Drawing Sheets

METHOD AND APPARATUS FOR PROCESSING WEB CALLS IN A WEB CALL CENTER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of Internet systems, and in particular, to a system that processes web calls in a web call center.

2. Description of the Prior Art

Current call centers require numerous service agents to answer traditional voice calls from customers. The call centers typically route the voice calls to the next available agent based on numerous criteria such as the time of day, the specific day, language preference, and the service agent's ability to handle the call. If no service agent is available, the call center places the voice call in a queue with other voice calls. For calls in the queue, the call center provides a variety of advertising messages or audio entertainment in order to prevent call abandonment. Once the next service agent becomes available, the call center routes the voice call with the highest priority in the queue to the service agent.

Call center companies now have a new medium for interaction with their call center customers with the expansion of the Internet. With the introduction of web browsers, the number of Internet users along with the number of companies selling their product or services over the Internet continue to grow. Companies target individual Internet users by placing "cookies" on the users' computers. These "cookies" provide a variety of marketing information to assist companies in various tasks such as pinpointing customers and providing precise marketing campaigns. Companies also provide chat rooms for users to discuss various subjects. Companies that provide chat room services control the number of users in the chat room and queue users waiting to enter the chat room. The Internet browser presents the position of the users in the queue to the user through Hyper Text Markup Language. Besides chat rooms, text e-mails, and web browsing, the Internet is rapidly expanding towards new types of communication such as video conferencing and voice calls.

A web call is an Internet session for exchanging information using call treatment or videoconferencing treatment. An example of call treatment is the H.323 standard by the International Telecommunications Union—Telecommunications (ITU-T). Currently, companies provide web call centers to handle these web calls. A gateway converts the web call into a traditional voice call. Then an automatic call distributor (ACD) routes the voice call to service agents at the call center. If no service agent is available, the ACD routes the call to a queue server to queue the call with other calls waiting for available service agents. The ACD also plays a recorded message to the voice call or routes the call to a voice response unit (VRU) that plays the recorded message to the voice call.

The lack of call processing for web calls is a problem. Call processing such as routing, queuing, and messaging is needed to better handle immediate response, language preferences, deterrence of web call abandonment, and targeted marketing campaigns.

SUMMARY OF THE INVENTION

The invention solves the above problem by providing web call processing for web call centers. The web call processing comprises routing, queuing, and/or provision of web service applications for web calls. For routing, the invention receives a call request message. In response to receiving the call request message, the invention identifies a web call center resource. The invention then generates and transmits a routing instruction to route the web call to the web call center resource. In an alternative embodiment of the invention, the invention routes the web call to the web call center resource after identifying the web call center resource.

For queuing, the invention receives a call request message for a web call. The invention then determines whether any web call center resource is available to handle the web call in response to receiving the call request message. The invention then transfers a web call indicator to a web call queue in response to the determination that all web call center resources are unavailable.

For web service applications, the invention receives a call request message for the web call. The invention then identifies the web service application for the web call. After identifying the web service application, the invention generates and transmits an instruction to provide the web service application to the web call. In alternative embodiments of the invention, the invention provides the web service application to the web call after identifying the web service application.

DETAILED DESCRIPTION OF THE PREFERRED EMBODIMENT

FIGS. 1-4 disclose one embodiment of the invention, but the invention is not restricted to the configuration provided below. Those skilled in the art will appreciate numerous variations in call center system configuration and operation that are within the scope of the invention. Those skilled in the art will also appreciate how the principles illustrated in this example can be used in other examples of the invention. A particular reference number in one figure refers to the same element in all of the other figures.

Figure 1:
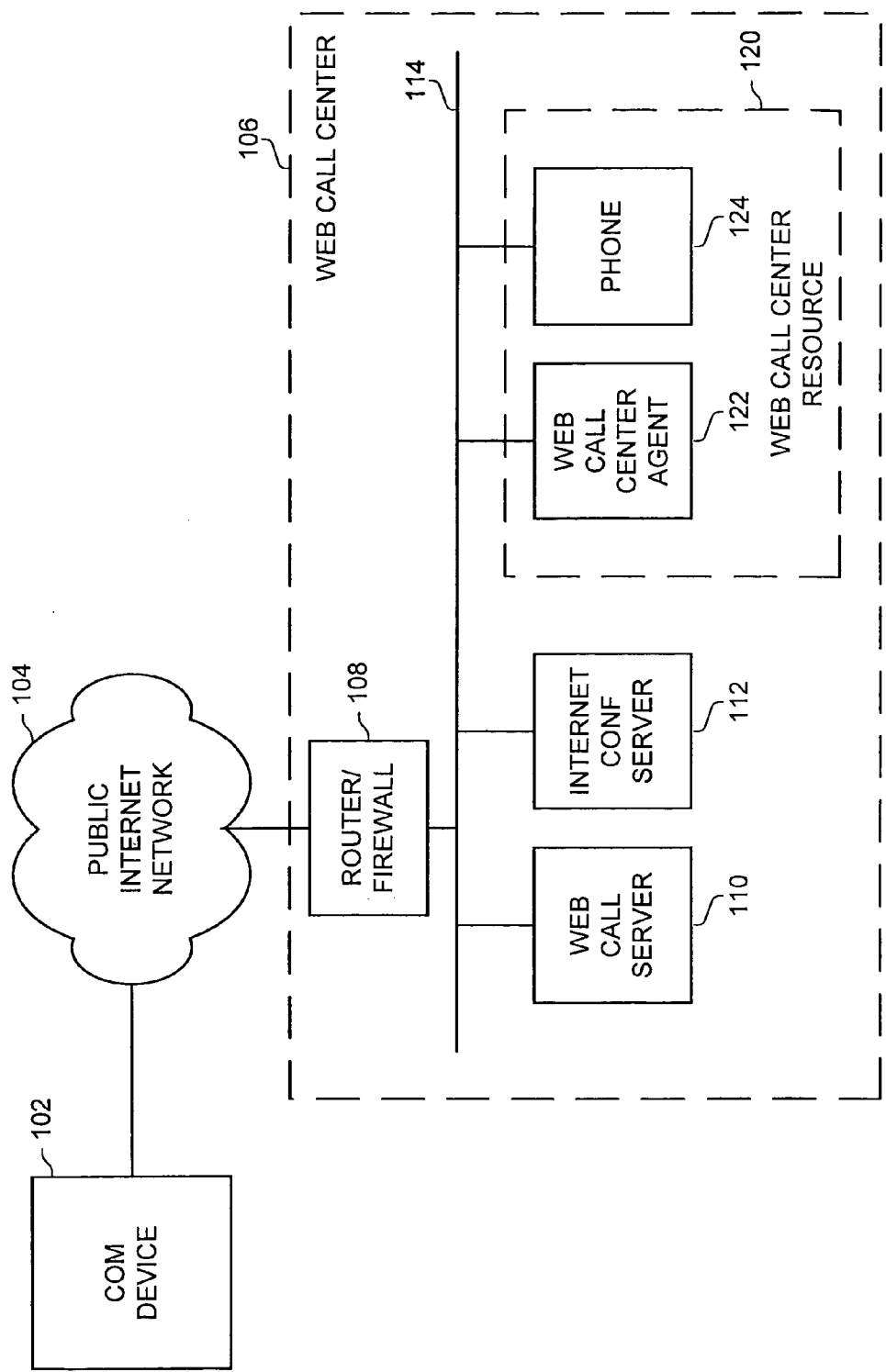
FIG. 1 is a system level block diagram in an example of the invention.

FIG. 1 depicts a system level block diagram in an example of the invention. A communication device 102 is connected to a public Internet network 104. A web call center 106 is comprised of a router/firewall 108, a web call server 110, an Internet conferencing server 112, a bus 114, and a web call center resource 120. The web call center resource 120 is comprised of a web call center agent 122 and a telephone 124. The router/firewall 108 is connected to the public Internet network 104 and the bus 114. The bus 114 is connected to the web call server 110, the Internet conferencing server 112, the web call center agent 122, and the telephone 124.

The communication device 102 is any device that transmits call request messages and exchanges information through a web call. The web call is an Internet session for exchanging information using call treatment or videoconferencing treatment. An example of a communication device is a personal computer. In various embodiments of the invention, the communication device uses a variety of software programs such as Internet web browsers and Microsoft's NetMeeting.

The public Internet network 104 is any Internet network device or group of Internet network devices that exchange call request messages and information through a web call between the communication device 102 and the web call center 106. Some examples of devices in the public Internet network 104 are switches, routers, and gateways.

The web call server 110 is any system that receives call request messages and processes the call request message to provide call processing for web calls. Some examples of call processing for web calls are routing, queuing, and providing web service applications. The web call center resource 120 is any device or group of devices that exchange information through web calls with the communication device 102 via the public Internet network 104 and the router/firewall 108. The router/firewall 108 is a conventional device that typically provide routing and security. The Internet conferencing server 112 also is a conventional device that provides the ability for an Internet conference call.

Figure 2:
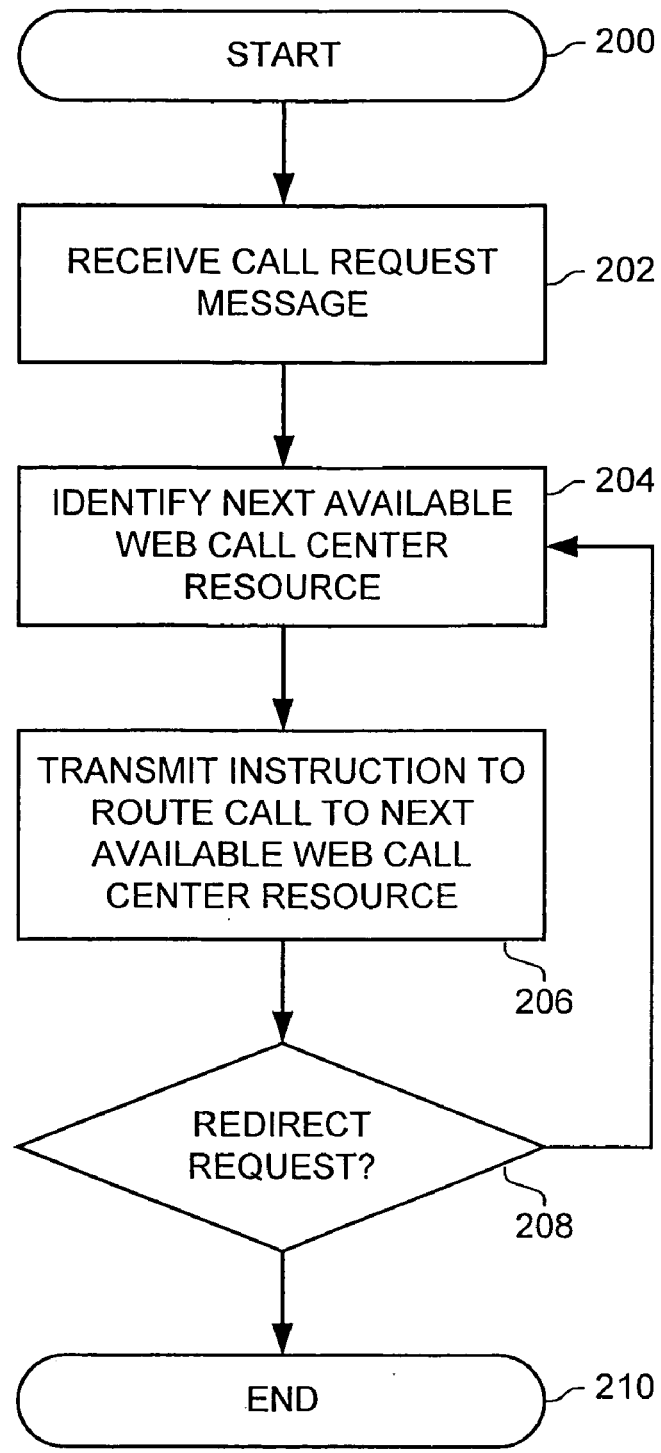
FIG. 2 is a flow chart for routing web calls in an example of the invention.

FIG. 2 depicts a flow chart for routing web calls in an example of the invention. FIG. 2 begins at step 200. In step 202, the web call server 110 receives a call request message originating from the communication device 102. The call request message is any message or signaling used to begin the web call. In some embodiments of the invention, the call request message is the web call itself. An example of the call request message is a Get document in Hyper Text Transfer Protocol (HTTP).

In step 204, the web call server 110, identifies the available web call center resource 120 in response to receiving the call request message. In other embodiments of the invention, the web call server 110 identifies the available web call center resource 120 based upon information stored in a cookie or a digital certificate. Those skilled in the art understand the use of cookies and digital certificates to identify customers and store information about the customer. The web call server 110 may identify the available web call center resource 120 based upon information entered by the caller. In various embodiments of the invention, the web call server 110 identifies the available web call center resource 120 based upon an Internet Protocol address, a domain name, a time of day, a day of the week, a day of the year, billing information of the call, a past sales history of the caller, a language preference of the caller, least busy agent, least congested route, class of service, quality of service, and/or caller profile information.

After the web call server 110 identifies the available web call center resource 120, the web call server 110 transmits an instruction for the communication device 102 to route the web call to the web call center resource 120 in step 206. One example of the instruction to route the web call to the web call center resource 120 is a redirect request in HTTP indicating the web call center resource 120. In another example, the redirection may also occur using a Network Address Translation (NAT). In alternative embodiments of the invention, the web call server 110 routes the web call to the web call center resource 120 in step 206. After the web call server 110 routes the web call, the web call server 110 checks if the web call server 110 received a redirect instruction in step 208. The redirect instruction would be any message or signaling for redirecting the web call to another web call center resource. For example, the caller may need to talk to the billing department after talking with a sales agent at the web call center. If the web call server 110 received the redirect instruction, the web call server 110 returns to step 204 to identify the next available web call center resource 120 that could handle the web call. If the web call server 110 did not receive the redirect instruction, the web call server 110 finishes the routing process at step 210.

Figure 3:
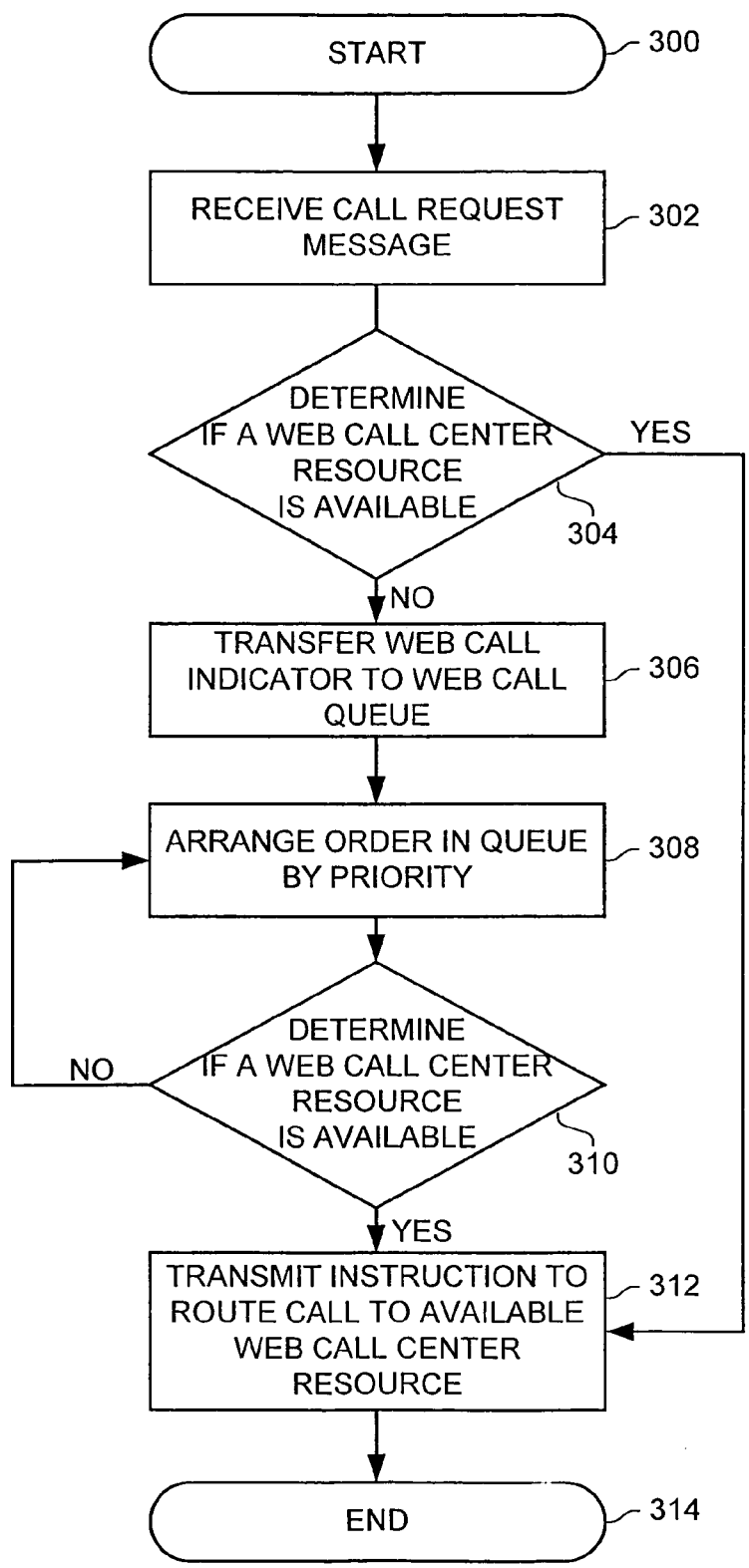
FIG. 3 is a flow chart for queuing web calls in an example of the invention.

FIG. 3 depicts a flow chart for queuing web calls in an example of the invention. FIG. 3 begins at step 300. In step 302, the web call server 110 receives the call request message originating from the communication device 102. In step 304, the web call server 110 determines if the web call center resource 120 is available to handle the web call in response to receiving the call request message.

In other embodiments of the invention, the web call server 110 determines if the web call center resource 120 is available to handle the web call based upon information stored in a cookie or a digital certificate. The web call server 110 may determine if the web call center resource 120 is available to handle the web call 120 based upon information entered by the caller. In various embodiments of the invention, the web call server 110 determines if the web call center resource 120 is available to handle the web call based upon an Internet Protocol address, a domain name, a time of day, a day of the week, a day of the year, billing information of the call, a past sales history of the caller, a language preference of the caller, least busy agent, least congested route, class of service, quality of service, and/or caller profile information.

If the web call center resource 120 is available, the web call server 110 proceeds to step 312 to route the web call. If no web call center resource 120 is available, the web call server 110 transfers a web call indicator to the web queue in step 306. The web call indicator is any message or signal that is indicative of the web call. In some embodiments of the invention, the web call indicator is the call request message or even the web call itself. In step 308, the web call server 110 arranges the order in the web queue by priority. In different embodiments of the invention, the priority of the web queue could be based on variety of queuing theories such as first in first out, last in first out, or based on priority level of the web call. The web call server 110 then determines if the web call center resource 120 is available to handle the web call in step 310.

If the web call server 110 determines that no web call center resource 120 is available, the web call server 110 returns to step 308 to arrange the order in the web queue. If the web call server 110 determines that the web call center resource 120 is available, the web call server 110 proceeds to step 312. In step 312, the web call server 110 identifies the available web call center resource 120 and generates and transmits an instruction to route the web call with the highest priority to the available web call center resource 120. The web call server 110 finishes the queuing process at step 314.

Figure 4:
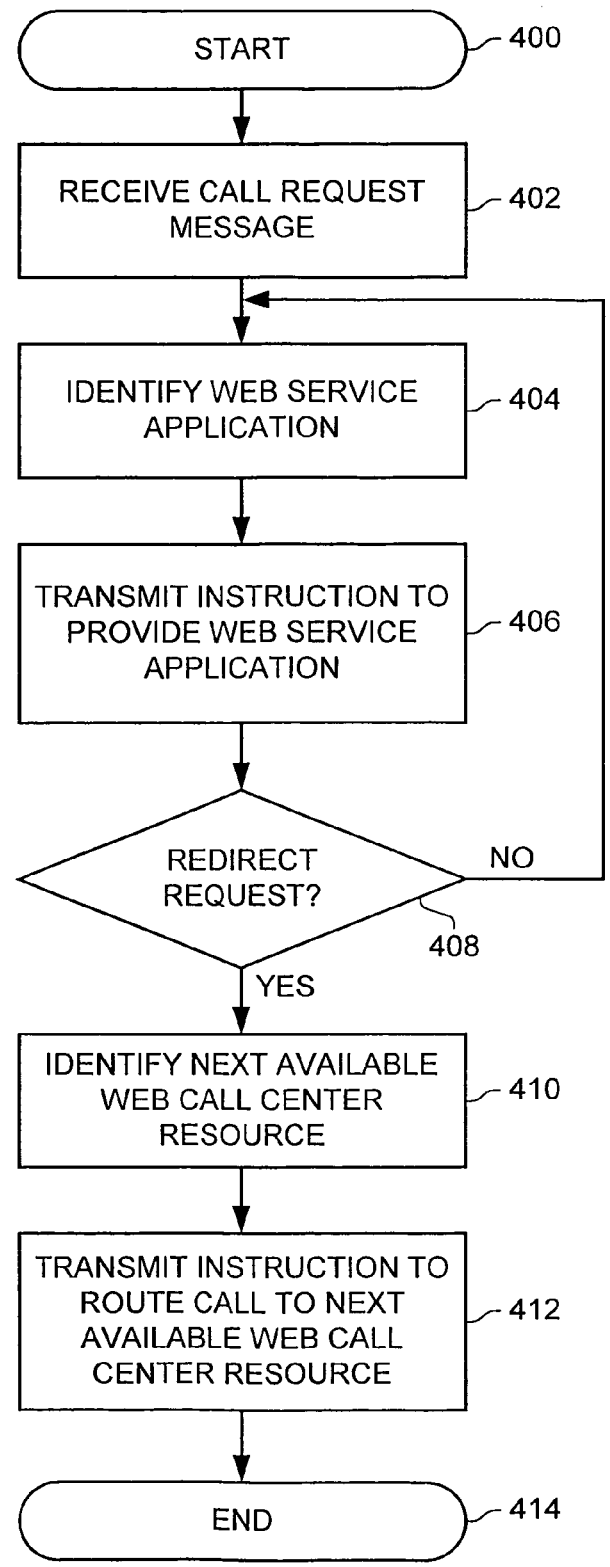
FIG. 4 is a flow chart for providing web call applications in an example of the invention.

FIG. 4 depicts a flow chart for providing web call applications in an example of the invention. FIG. 4 begins at step 400. In step 402, the web call server 110 receives a call request message originating from the communication device 102. The web call server 110 then identifies a web service application to provide for the caller. The web service application is any type of messaging or interactive application that is provided to the caller. Some examples of web service applications are advertising messaging, selecting a language preference, servicing a customer account (i.e. checking balances), shopping, and providing product or service information.

In other embodiments of the invention, the web call server 110 identifies a web service application to provide for the caller based upon information stored in a cookie or a digital certificate. Those skilled in the art understand the use of cookies and digital certificates to identify customers and store information about the customer. The web call server 110 may identify a web service application to provide for the caller based upon information entered by the caller. In various embodiments of the invention, the web call server 110 identifies a web service application to provide for the caller based upon an Internet Protocol address, a domain name, a time of day, a day of the week, a day of the year, billing information of the call, a past sales history of the caller, a language preference of the caller, and/or caller profile information.

Once the web call server 110 identifies the web service application, the web call server 110 transmits an instruction to provide the web service application in step 406. During the provision of the web service application, if the caller requests a redirect to the web call center resource in step 408, the web call server 110 identifies the next available web call center resource 120 in step 410. If the caller does not request the redirect, the web service application continues to be provided to the caller or the web call server 110 identifies a new web service application in step 404. After the web call server 110 identifies the web call center resource in step 410, the web call server 110 transmits an instruction to route the web call to the available web call center resource 120. The web call server 110 finishes the provision of web service applications at step 414.

In other embodiments of the invention, the web call center resource 120 transmits a request for a conference call to the Internet conferencing server 112. The Internet conferencing server 112 then processes the request and commences an Internet conference with another call.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a call server for routing voice calls to a plurality of call center resources in a call center the method comprising:
   receiving a voice call originating from a user device including a cookie;
   processing the cookie from the user device to select a first call center resource;
   generating a routing instruction indicating a first route for the voice call originating from the user device to the first call center resource; and
   transferring the routing instruction to be used when routing the voice call from the user device to the first call center resource over which voice communications will be exchanged.

2. The method of claim 1, further comprising:
   receiving a redirect instruction in the call server;
   processing the redirect instruction to select a second call center resource;
   generating a second routing instruction indicating a second route for the voice call originating from the user device to the second call center resource; and
   transferring the second routing instruction to be used when routing the voice call from the user device to the second call center resource over which voice communications will be exchanged.

3. The method of claim 1, wherein the voice call comprises a Get Document request in Hyper Text Transfer Protocol.

4. The method of claim 1, wherein processing the cookie from the user device to select the first call center resource is further based upon caller entered information.

5. The method of claim 1, wherein processing the cookie from the user device to select the first call center resource is further based upon a domain name or an Internet Protocol address.

6. The method of claim 1, wherein processing the cookie from the user device to select the first call center resource is further based upon one or more of a day or a time of day.

7. The method of claim 1, wherein processing the cookie from the user device to select the first call center resource is further based on a least busy agent.

8. The method of claim 1, wherein processing the cookie from the user device to select the first call center resource is further based on a least congested route.

9. The method of claim 1, wherein processing the cookie from the user device to select the first call center resource is further based on one or more of a class of service or a quality of service.

10. The method of claim 1, further comprising processing the cookie to select a web service application.

11. A communication system for routing voice calls, the communication system comprising:
    a plurality of call center resources for handling the voice calls; and
    a call center server configured to receive a voice call originating from a user device and including a cookie, process the cookie from the user device to select a first call center resource, generate a routing instruction indicating a route for the voice call from the user device to the first call center resource, and transfer the routing instruction to be used when routing the voice call from the user device to the to the first call center over which voice communications will be exchanged.

12. The communication system of claim 11, wherein the call center server is further configured to receive a redirect instruction, process the redirect instruction to select a second call center resource, generate a second routing instruction indicating a second route for the voice call from the user device to the second call center resource, and transfer the second routing instruction to be used when routing the voice call from the user device to the second call center resource over which voice communications will be exchanged.

13. The communication system of claim 11, wherein the voice call comprises a Get Document request in Hyper Text Transfer Protocol.

14. The communication system of claim 11, wherein processing the cookie from the user device to select the first call center resource is further based upon caller entered information.

15. The communication system of claim 11, wherein processing the cookie from the user device to select the first call center resource is further based upon a domain name or an Internet Protocol address.

16. The communication system of claim 11, wherein processing the cookie from the user device to select the first call center resource is further based upon one or more of a day or a time of day.

17. The communication system of claim 11, wherein processing the cookie from the user device to select the first call center resource is further based on a least busy agent.

18. The communication system of claim 11, wherein processing the cookie from the user device to select the first call center resource is further based on a least congested route.

19. The communication system of claim 11, wherein processing the cookie from the user device to select the first call center resource is further based one or more of a class of service or a quality of service.

20. The communication system of claim 11, wherein the call center is further configured to process the cookie to select a web service application.

* * * * *